(12) United States Patent
Wazana et al.

(10) Patent No.: US 7,592,567 B2
(45) Date of Patent: Sep. 22, 2009

(54) APPARATUS AND METHOD FOR DISASSEMBLING CONTAINERS HAVING THERMOPLASTIC JOINING SURFACES

(75) Inventors: Yoel Wazana, Northridge, CA (US); Joda Paulus, Palmdale, CA (US)

(73) Assignee: Wazana Brothers International, Inc., Van Nuys, CA (US)

( * ) Notice: Subject to any disclaimer, the term of this patent is extended or adjusted under 35 U.S.C. 154(b) by 0 days.

(21) Appl. No.: 10/659,881

(22) Filed: Sep. 11, 2003

(65) Prior Publication Data
US 2005/0056624 A1  Mar. 17, 2005

(51) Int. Cl.
*B23K 26/14* (2006.01)
*B23K 26/16* (2006.01)

(52) U.S. Cl. .......................... 219/121.67; 219/121.72; 219/121.85

(58) Field of Classification Search ............ 219/121.67, 219/121.72, 121.85, 121.6; 29/650
See application file for complete search history.

(56) References Cited

U.S. PATENT DOCUMENTS

| | | | |
|---|---|---|---|
| 4,533,814 A | | 8/1985 | Ward |
| 4,549,066 A | * | 10/1985 | Piccioli et al. ......... 219/121.67 |
| 4,739,546 A | | 4/1988 | Tachibana et al. |
| 4,851,061 A | | 7/1989 | Sorkoram |
| 5,525,183 A | * | 6/1996 | Baley ......................... 156/344 |
| 5,676,794 A | * | 10/1997 | Baley ......................... 156/584 |
| 5,781,831 A | * | 7/1998 | Matsuzaki et al. .......... 399/119 |
| 5,907,747 A | * | 5/1999 | Diener ....................... 399/109 |
| 6,007,756 A | | 12/1999 | Weiteder et al. |
| 6,029,031 A | * | 2/2000 | Yokomori et al. ........... 399/109 |
| 6,207,925 B1 | | 3/2001 | Kendall |
| 6,223,010 B1 | * | 4/2001 | Araki ......................... 399/109 |
| 6,227,638 B1 | * | 5/2001 | Childers et al. ................ 347/7 |
| 6,289,188 B1 | * | 9/2001 | Litman et al. ............... 399/109 |
| 6,464,327 B1 | * | 10/2002 | Eckard et al. ................. 347/33 |
| 6,491,361 B1 | | 12/2002 | Spann |
| 6,577,830 B1 | | 6/2003 | Wazana et al. |
| 6,609,044 B1 | * | 8/2003 | Basista et al. ............... 700/166 |
| 6,653,210 B2 | | 11/2003 | Choo et al. |
| 6,754,460 B2 | | 6/2004 | Lewis et al. |
| 6,864,294 B2 | * | 3/2005 | Koike et al. ................... 521/40 |
| 2002/0030039 A1 | | 3/2002 | Kerner |
| 2003/0170045 A1 | * | 9/2003 | Lewis et al. ................. 399/109 |
| 2004/0067326 A1 | | 4/2004 | Koerzer et al. |

FOREIGN PATENT DOCUMENTS

EP 0661609 A2 12/1994
EP 0909553 AL 10/1998

OTHER PUBLICATIONS

Merriam-Webster's Collegiate Dictionary, 11th Ed, 2003, Cover, Publishing Information page and p. 528.
Merriam-Webster Online Dictionary, http://www.merriam-webster.com/dictionary/GIMBAL, Mar. 24, 2008.

* cited by examiner

*Primary Examiner*—M. Alexandra Elve
(74) *Attorney, Agent, or Firm*—Lewis, Brisbois, Bisgaard & Smith LLP

(57) ABSTRACT

An apparatus and method for disassembling a container having sections joined at sealed thermoplastic joining surfaces, such as toner cartridges, by cutting between the joined sections with a computer controlled laser beam, the beam being variable in intensity and/or in speed of travel along the joining surfaces. The technique may be applied to other articles, such as inkjet cartridges and any thermoplastic container that should be opened with precision.

2 Claims, 5 Drawing Sheets

APPARATUS AND METHOD FOR DISASSEMBLING CONTAINERS HAVING THERMOPLASTIC JOINING SURFACES

TECHNICAL FIELD

The present invention relates to the field of laser cutting in which a thermoplastic container, or a container having thermoplastic joining surfaces, desired to be preserved or reassembled for further use is disassembled or opened by cutting it with a laser beam controlled as to movement and speed along a prescribed path with respect to the surface of the container. The present invention finds particular application in the remanufacturing industry.

BACKGROUND ART

Lasers produce intense coherent light and have been applied to many uses. Among those uses are etching and cutting by virtue of the intense radiant energy of the laser light beam and printing wherein the laser light "paints" an image on a charged rotating drum by altering the charge distribution on the surface of the drum in a so called laser printing device.

Among the numerous types of engineered containers manufactured to a high degree of precision common in modern industry, are, for example, toner cartridges for laser printing. Other such containers include, by way of example, those such as electronic device and/or circuit containers, inkjet cartridges, instrument packages, single use containers of many types, such as filter elements, absorbents, fire extinguishers and the like. In the case of toner cartridges, for example, a high degree of precision in manufacture is necessary for proper operation and good printed image quality. Process or toner cartridges manufactured from new components by original equipment manufactures typically are made of a thermoplastic material such as one of the Acrylonitrile Butadiene Styrene (ABS) polymers or other relatively hard, tough, rigid and relatively low melting temperature polymer.

Central to proper operation of a process or toner cartridge is proper alignment and orientation of its various components, as well as proper sealing of the cartridge to avoid the leakage of toner. Original equipment manufacturers achieve the necessary alignment and orientation of toner cartridge components, by sealing the cartridge sections together along engineered joining interfaces. Typically, the original equipment cartridge sections are joined by ultrasonic welding, rivets, adhesive, mechanical fasteners or some combination of these methods.

The process of remanufacturing a toner or process cartridge requires that the original equipment cartridge, aftermarket cartridge or previously remanufactured cartridge be disassembled in such a manner that it may be reassembled with its components in the location, alignment and orientation necessary for proper operation. Typically, a hopper section of the cartridge which holds the toner is to be separated from a roller section which contains the developer roller and other components. Some toner or process cartridges are originally manufactured with the interfacing joining surfaces of adjoining sections having a circuitous or serpentine path or course and with relatively fragile components such as electrical conductors or printed circuit tapes or boards passing through or very near the joining interface of the adjoining sections. Such configurations may be found also in electronic device containers, inkjet cartridges and some instrument packages and single use dispensers, for example.

Heretofore, in containers having such features, a problem has existed in disassembling the container without damaging fragile components and in doing so in a manner as to permit reassembly. A conventional approach to this problem has been to manually disassemble the sections of the container, with or without the aid of a positioning jig, by mechanical means such as rotary blades, router heads, saws, grinders or the like. These techniques, while generally effective suffer a number of drawbacks, including worker safety issues arising from dust and debris generated and the use of mechanical cutting devices. Another such drawback is that manual disassembly is subject to human error and variation in quality. Yet another drawback is that manual disassembly is highly labor intensive resulting in increased production costs.

SUMMARY DISCLOSURE OF EMBODIMENTS OF THE INVENTION

The present invention provides an apparatus and method for disassembling a thermoplastic container, or a container having thermoplastic joining surfaces, by programmed laser cutting. The thermoplastic may be composed of ABS or other polymer that melts in the same temperature range as ABS materials. The product resulting from application of the method is maintained in a condition suitable for remanufacturing and/or reassembly.

In its several embodiments, the present invention provides an operational laser cutting apparatus for separating sections of a container along a predetermined precise path, including separating adjoining sections having joining surfaces interfacing along a circuitous or serpentine path or course, and further provides a method whereby this may be accomplished. The course and speed of the cutting laser beam and the orientation of the container is operationally controlled by a preprogrammed computer processor (CPU) so that damage to relatively fragile components such as electrical conductors or printed circuit boards passing through or very near the joining interface is avoided.

BRIEF DESCRIPTION OF THE DRAWINGS

The nature and scope of the several embodiments of the invention will become apparent from the following detailed description taken in connection with the accompanying drawings, in which.

DESCRIPTION OF THE INVENTION

Figure 1:
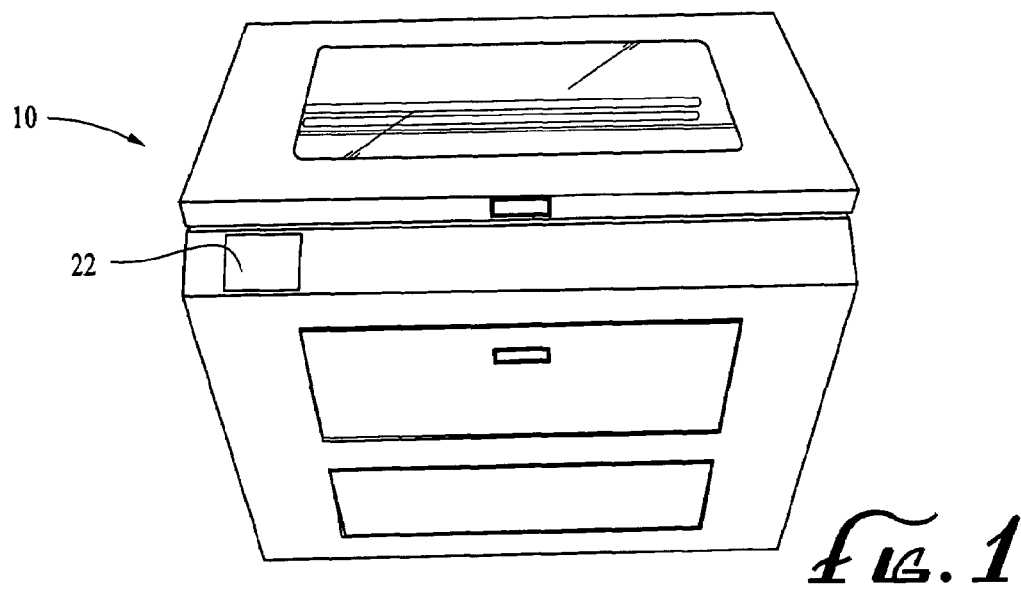
FIG. 1 is a perspective front view the housing in which the laser cutting apparatus is disposed.
Figure 2:
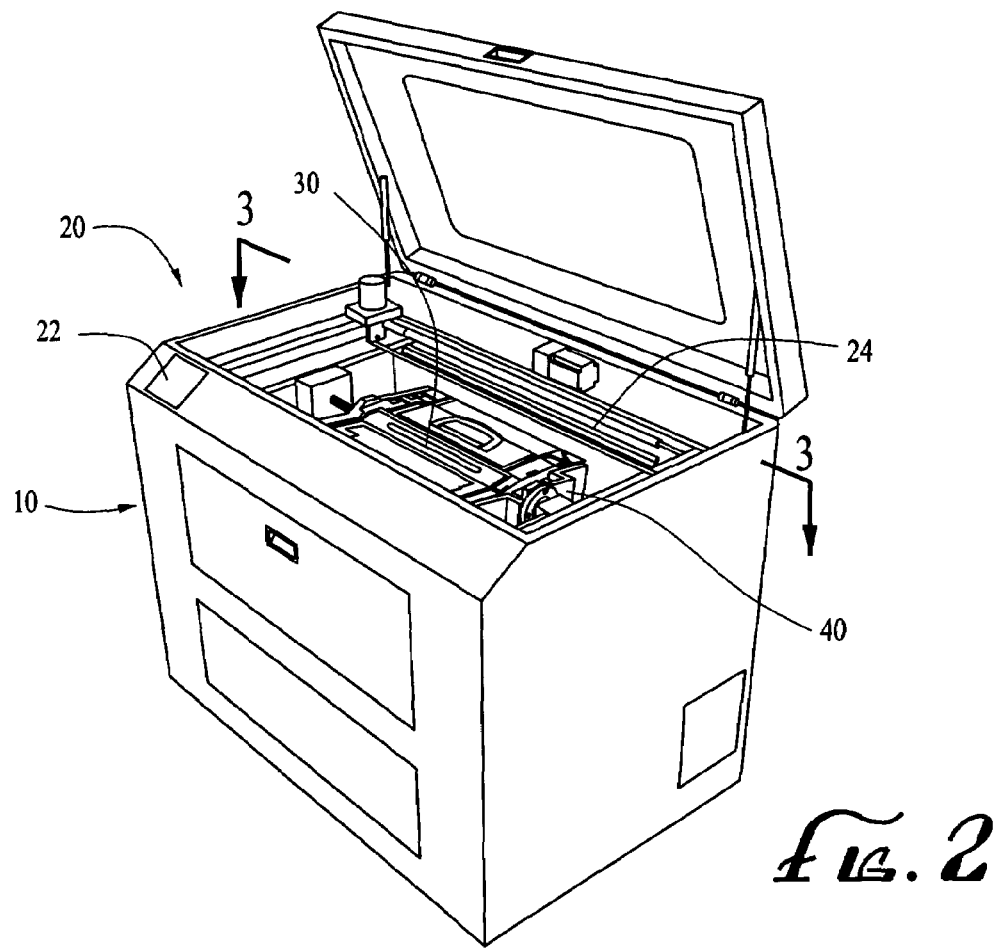
FIG. 2 is a perspective view of the housing with the cover open to reveal the chassis, work piece gimbal and a work piece.

To illustrate and further describe the embodiments of the present invention, reference will be made to FIGS. 1-8.

The invention provides an apparatus and method for disassembling or opening containers having separate or separable sections or pieces that have been joined together along interfacing surfaces or joining surfaces composed of a thermoplastic material. The apparatus and method are useful for efficiently and quickly disassembling containers desired to be remanufactured and/or reassembled, for opening containers to inspect, test, replace or salvage components with reduced risk of damage compared to mechanical methods such as cutting. Typically, such containers include laser printing toner cartridges and inkjet cartridges whether original equipment, after market, or remanufactured products, single use containers of a wide variety of consumables or expendables, electronic circuit packages, and the like.

With reference to FIGS. 1-4, the apparatus of the present invention [20] is preferably housed in a cabinet [10], both to provide for safety of operating personnel and for protection of the apparatus. The apparatus [20] includes a laser [not shown] which is preferably mounted in a fixed location within the cabinet [10]. The cabinet supports a chassis [28] upon which a movably adjustable optical system [24], also referred to herein as a movably adjustable light path [24] is mounted. The movable elements of the optical system [24] are preferably driven by electric motors [26] which are preferably mounted on the chassis [28]. The movably adjustable light path [24] receives the laser beam [50] projected from laser [not shown] when it is activated and directs the laser beam [50] to a preselected spot or location. The laser [not shown] and movably adjustable light path [24] are operationally connected to a conventional computer [not shown] containing a central processor unit (CPU). The computer [not shown] is linked to an instruction input device such as a control panel [22] and commands the operation of the laser [not shown] and the movement of the movably adjustable light path [24] in response to a selected computer program or software application that is run in the computer.

The movably adjustable light path [24] may be commanded by the computer [not shown] or control panel [22] and/or other instruction input device such as an external computer, to direct the laser beam [50] to any point within a bounded area of a plane parallel with the plane defined by the moveable element of the moveable optical system [24] within the cabinet [10] and to move in a direction [25] along a predetermined path from one point to another within the plane at a selected constant or variable speed. The instruction input device may be the control panel [22] or an external device such as another computer. The output power of the laser [not shown] is selected on the basis of the nature and thickness of the material intended to be cut, and may range from a laser beam output power of about 1 watt to about 100 watts.

Computer controlled laser cutting and/or etching devices such as described herein above and suitable for use in the present invention are readily available from manufacturers such as Xenetech Global, Inc., 12139 Airline Highway, Baton Rouge, La. 70817 as its model XLT-1325 laser engraving system, or from BEAM Dynamics Inc., 541 Taylor Way, San Carlos, Calif. 94070. Computer programs or software applications as described herein above and suitable for use in the present invention to control the laser and the movement of the laser beam are readily available from Xenetech Global, Inc. as its Xenetech Graphic Workstation (XGW-32) software, as well as the Laser-Link software available from BEAM Dynamics Inc.

Figure 3:
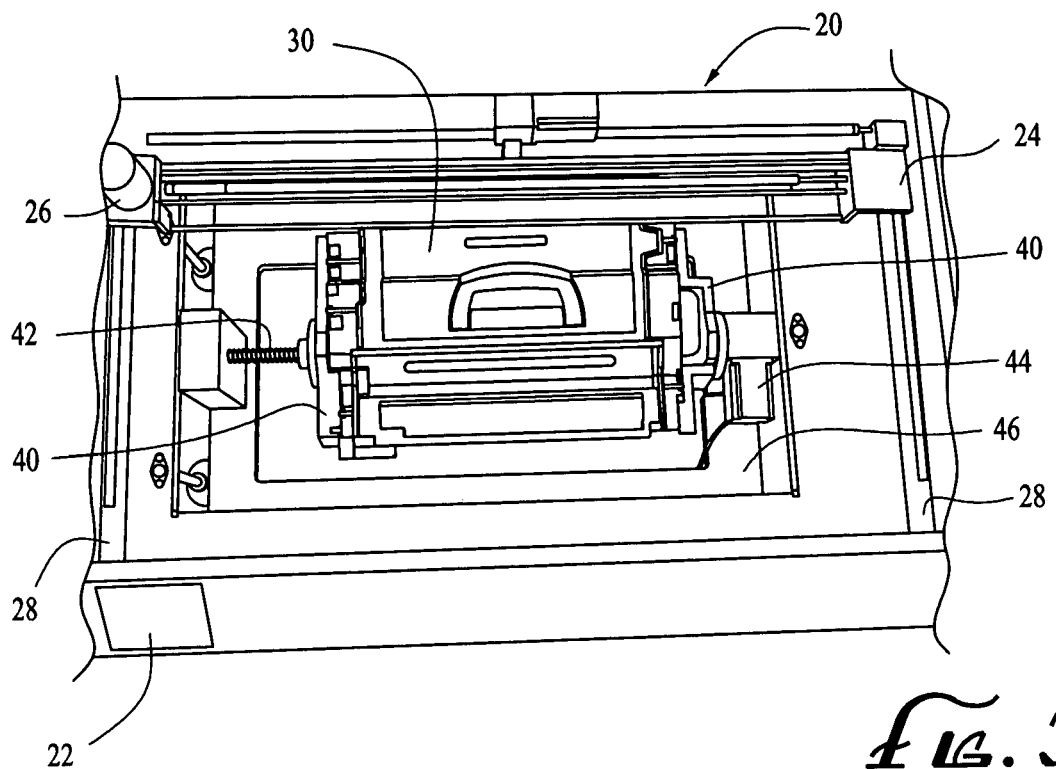
FIG. 3 is a top view of the housing with the cover open to reveal the chassis, work piece gimbal and a work piece.
Figure 4:
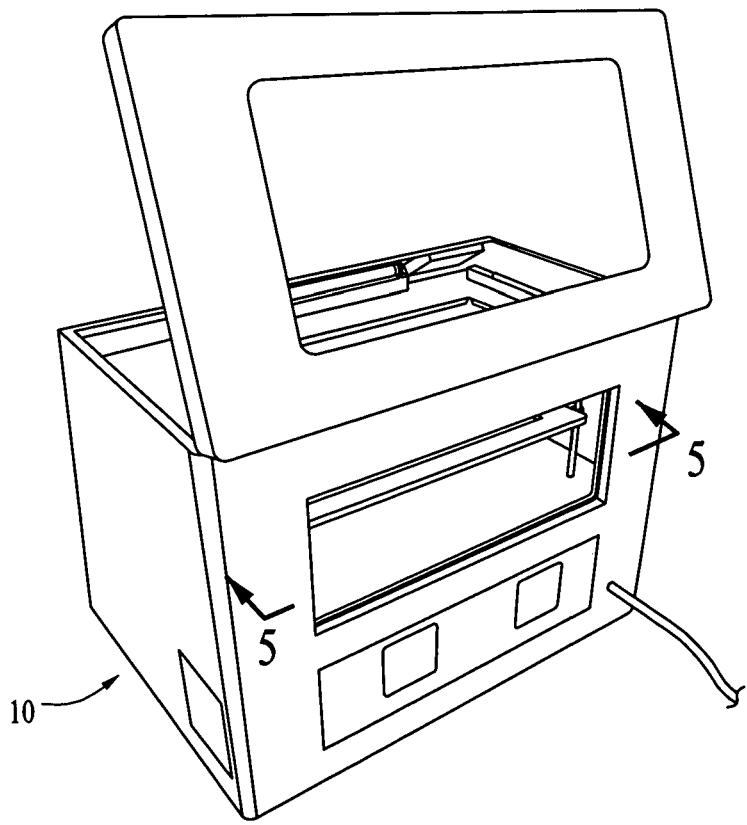
FIG. 4 is a rear perspective view of the housing with the cover open.
Figure 5:
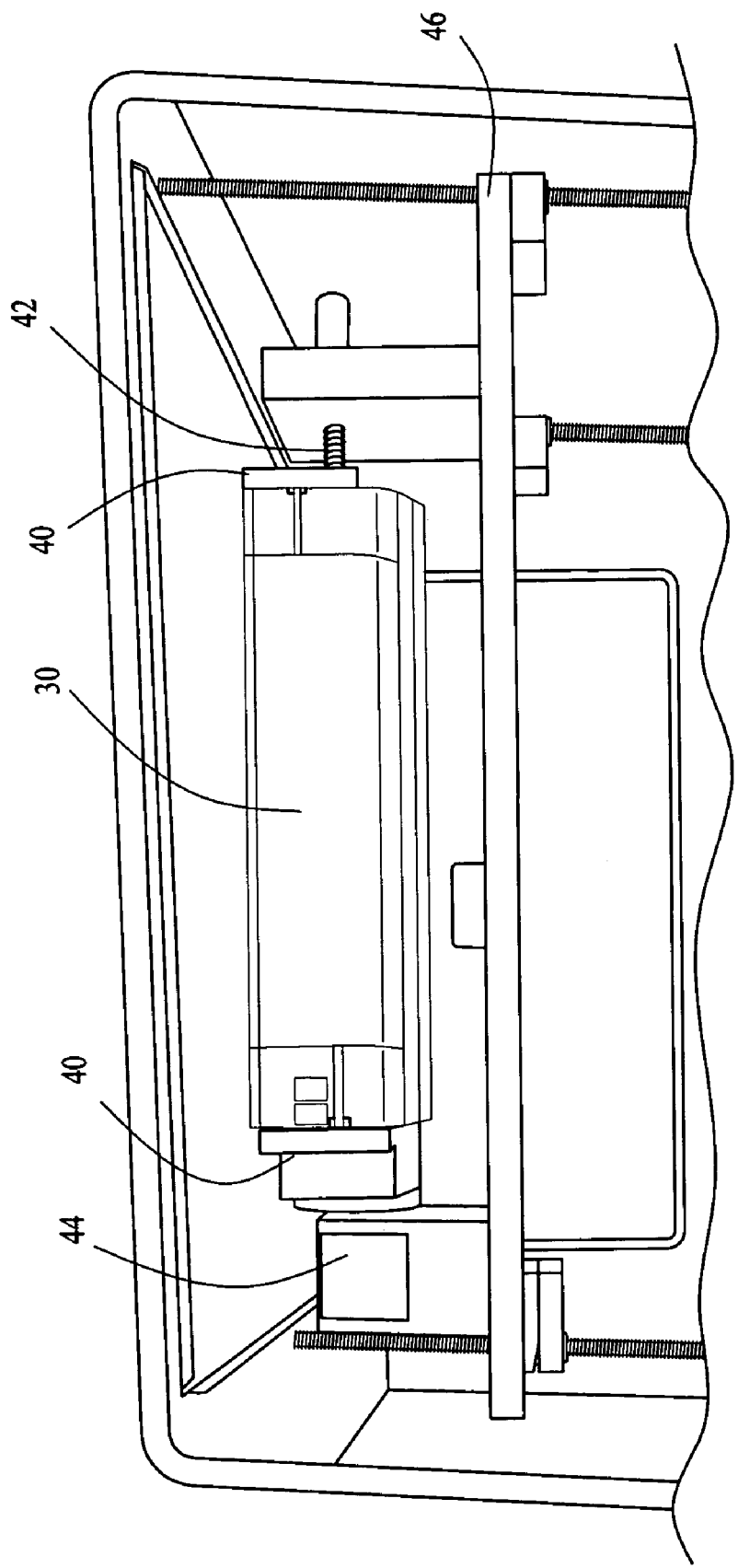
FIG. 5 is a cross-section view through a portion of the FIG. 2 housing showing the work piece gimbal and a work piece disposed in the gimbal.
Figure 6:
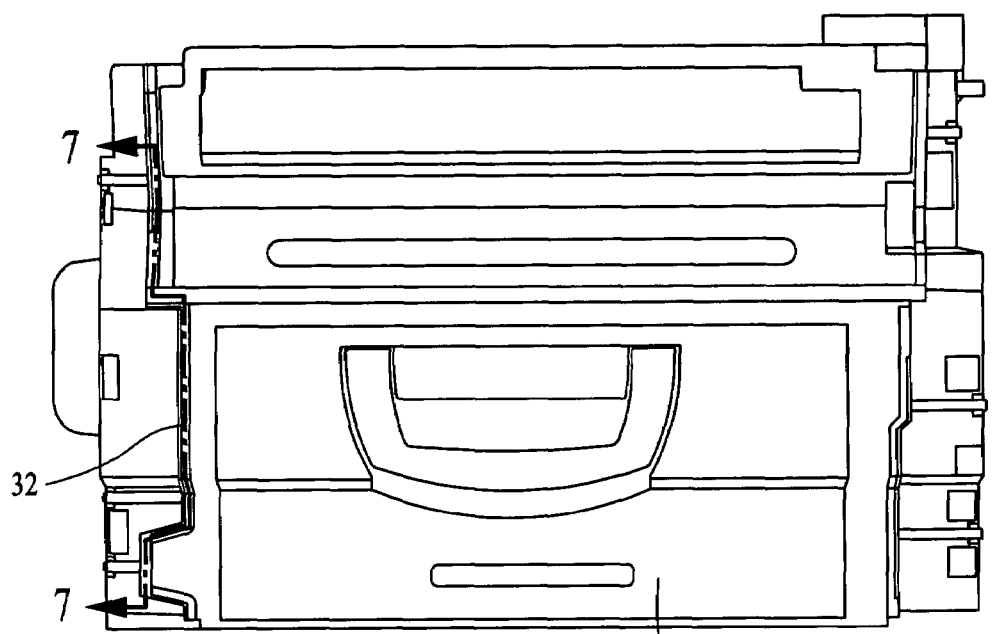
FIG. 6 is a top view of a representative process cartridge to which the method of the present invention is applied showing by interrupted line [7] a circuitous interface along which sections of the cartridge are joined.

With reference to FIGS. 3, 5 and 6, a container [30], that may be an original equipment product or an after market or remanufactured product, which may be constructed of a single piece or multiple pieces or sections joined along interfacing joining surfaces [32] is shown removably retained in gimbal [40]. In the case of a container having multiple pieces or sections, the joining surfaces [32] are composed of thermoplastic material. As will be understood by one of ordinary skill in the art, thermoplastic materials include such relatively low melting temperature polymers as acetals, acrylics, acetate, phenolics, polyamides, polycarbonate, polyesters, polyurethanes, styrenes and acrylonitrile butadiene styrene, for example. Containers constructed of entirely of a thermoplastic material, whether of single or multiple piece construction are within the scope of the present invention.

As shown in FIG. 5, gimbal [40] may be rotated about axis [42] oriented substantially parallel with the plane defined by the movable elements of the optical system [24], by motor [44] operationally connected with and controlled by computer [not shown] in response to a computer program or by commands input through the instruction input device [not shown]. Gimbal [40] and motor [44] are mounted on motorized platform [46] which is operationally connected with the computer [not shown] and instruction input device [not shown] and may be raised and lowered in response to a computer program or by commands input through the control panel [22] or an instruction input device.

Figure 7:
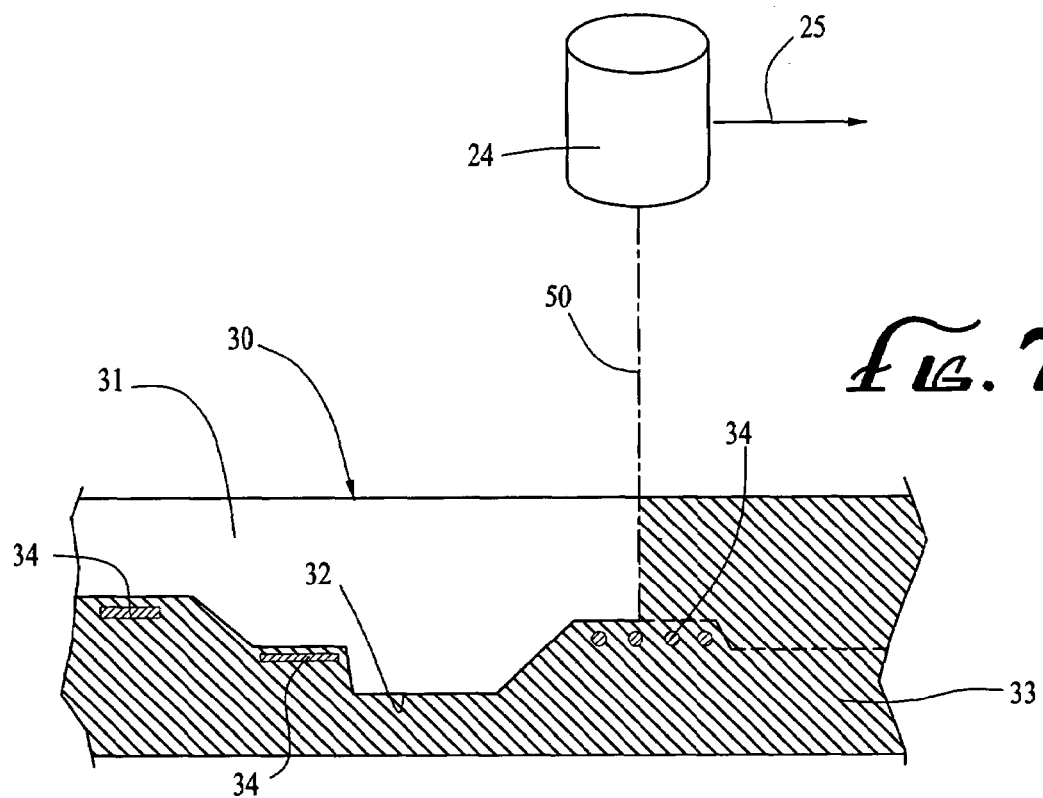
FIG. 7 is a cross-sectional view through a portion of the FIG. 6 representative process cartridge showing a stylized joining interface between container sections depicting a portion of the joining interface cut by the laser beam without involving structures disposed proximate to the joining interface.

With reference to FIG. 7, some containers may have various functional elements [34] such as electrical conductors, electronic components or printed circuit tapes or boards disposed on, in or passing through the container's walls. In some containers, the functional elements [34] are disposed closely adjacent or proximate the interface between joining surfaces of container sections. In the present invention, the laser beam is narrowly focused and directed along a path closely tracing the interface so as to not impinge upon such functional elements [34] to preserve their integrity and operability.

Setup For Disassembly

Prior to disassembly of each different style, type or model of container, parameters specific to the selected container are entered and stored in computer [not shown] for access by the application software as follows.

The thickness of the thermoplastic along each segment of the lines of demarcation between interfacing joining surfaces [32] of the container [30] are determined. The thickness of the thermoplastic to be cut along each such interface line segment is correlated with the laser beam power to determine the speed that the laser beam is to be moved to cut through the thickness of each such line segment. The speed of the laser beam required to cut through the thermoplastic is determined empirically apriori for each thickness and type of thermoplastic.

The container [30] is retained in gimbal [40] which is in an initial position and the initial position of the gimbal is entered into the computer [not shown] via an instruction input device and stored in the computer [not shown].

An initial or starting point on a selected line of demarcation between interfacing joining surfaces [32] of the container [30] is selected and instructions are input to the optical system or light path [24] to move to position the projected laser beam

[50] onto that point on the interface line, and the position of the optical system [50] is stored in the computer [not shown].

As will be understood in view of FIG. 6, instructions are input to the optical system or light path [24] to move the projected laser beam [50] along a segment of the interface line from the initial position to a second position on the interface line, and the path and second position of the optical system [24] is stored in the computer [not shown]. This step is repeated until the path of the selected interface line has been traced and stored in the computer [not shown].

After each step described above, a determination is made whether a change of position of the gimbal [40] is required to enable the selected interface line to be traced by the laser beam [50], and if so, instructions are input to the gimbal motor [44] to move the gimbal [40] to a selected new position, and the new position of the gimbal [40] is stored in the computer [not shown] together with when in the sequence of steps to change the position of the gimbal [40].

In consideration of the composition and thickness of the thermoplastic material along the interface line, instructions are entered and stored in the computer [not shown] as to the speed the laser beam [50] is to be moved along each segment of the interface line [32], and whether the speed is to be constant or varied, to cut through the thermoplastic material at each point along the interface line [32] at a selected laser beam [50] power output.

In further consideration of the composition and thickness of the thermoplastic material along the interface line, instructions are entered and stored in the computer [not shown] as to the intensity of the laser beam [50] along each segment of the interface line, and whether the intensity is to be constant or varied, to cut through the thermoplastic material at each point along the interface line [32].

Set up of the apparatus [20] for the disassembly of a particular style, type or model of container [30] is complete when the sequence of steps set forth above have been repeated for each selected interface line between joining surfaces [32].

The Disassembly Method

The steps and procedures of an embodiment of the method or process for disassembly of a container are described below.

A container [30], such as an original equipment manufacturer's, after market manufacturer's or remanufacturer's toner cartridge, for example, is selected for disassembly. The selected container [30] is positioned and removably retained in the gimbal [40] and the gimbal oriented to a predetermined initial position or orientation.

The set up information, as described above, for the particular container [30] to be disassembled stored in the computer [not shown] is selected via the control panel [22], or other instruction input device, for access by the computer program that controls the laser [not shown] and the movement of the movably adjustable light path [24] and gimbal [40], and the computer program is instructed to execute.

Figure 8:
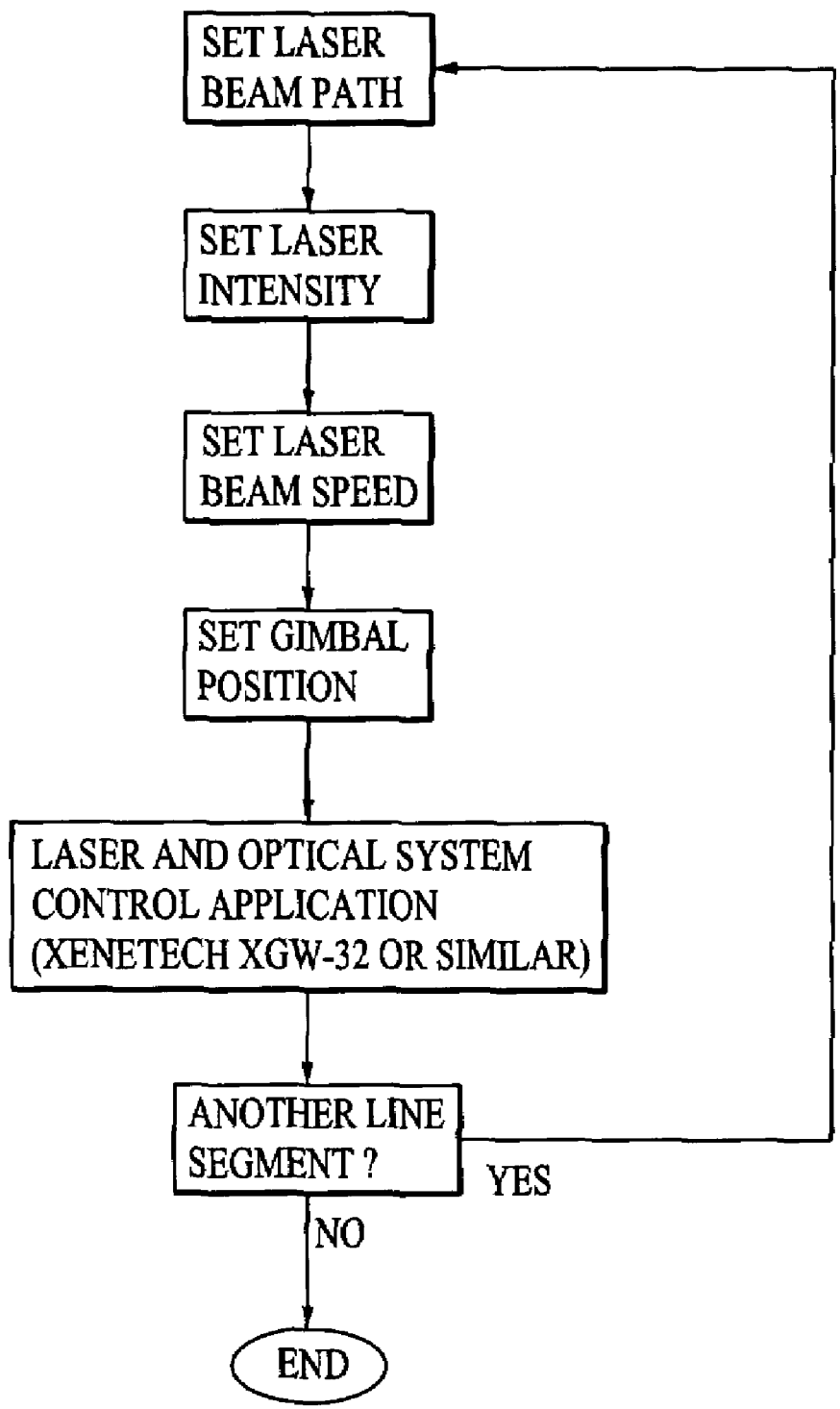
FIG. 8 is a schematic diagram of a logic flow chart for the operational control of the apparatus of the present invention.

Under control of the computer program, the logic flow chart of which is shown in FIG. 8, the laser [not shown], gimbal [40] and optical system [24] are operated to move or trace the laser beam [50] at predetermined speeds and intensities along a predetermined path coincident with each interface line between the thermoplastic joining surfaces [32] of the container [30] to cut through the container [30] along each such path.

Once the computer program has been executed, the container [30] is removed from the gimbal [40], and its sections [31, 33] separated along the cuts made by the laser beam [50].

While the present invention has been described in connection with what are present considered to be the most practical and preferred embodiments, it is to be understood that the invention is not to be limited to the disclosed embodiments, but to the contrary, is intended to cover various modifications and equivalent arrangements included within the spirit of the invention, which are set forth in the appended claims, and which scope is to be accorded the broadest interpretation so as to encompass all such modifications and equivalent structures.

What is claimed is:

1. A method for disassembling a laser printer toner cartridge having adjoining sections joined at thermoplastic joining surfaces into cut sections comprising:
   executing a set-up procedure comprising:
   (a) providing a toner cartridge including electrical conductors passing very near to the joining surfaces of the adjoining sections, said joining surfaces comprising a plurality of interface line segments, each of said interface line segments having a thickness;
   (b) providing a computer implemented laser cutting system including a computer, a laser adapted to project a laser beam, a rotation device positioned in an initial rotation device position and adapted to move in one dimension, and a moveably adjustable light path;
   (c) determining the thickness of the thermoplastic material along each of said interface line segments;
   (d) determining laser beam intensity and laser beam speed of travel along each of said interface line segments sufficient to cut through the thickness of the thermoplastic material along each of said interface line segments without impinging on any electrical conductor passing very near to the joining surfaces of adjoining sections;
   (e) retaining the cartridge in the rotation device that is in the initial rotation device position;
   (f) entering and storing into the computer data representative of the initial rotation device position;
   (g) selecting an initial point of a selected line segment of said interface line segments;
   (h) entering and storing into the computer instructions to position the movably adjustable light path to direct the laser beam onto the initial point on the selected line segment and to trace the selected line segment for a predetermined distance to a second point on the selected line segment to thereby define a laser beam path for the selected line segment;
   (i) determining whether a change in position of the rotation device from the initial rotation device position is required to enable the predetermined distance of the selected line segment to be traced by the laser beam, and if so required, entering and storing into the computer (i) instructions to move the rotation device to a selected new rotation device position that will enable the predetermined distance of the selected line segment to be traced by the laser beam, (ii) the new rotation device position and (iii) when the rotation device is to be moved to the new rotation device position, and if not so required, proceeding to;
   (j) entering and storing into the computer (i) instructions to project the laser beam along the selected line segment for the predetermined distance from the initial point to the second point, (ii) the laser beam path and (iii) the second point;
   (k) entering and storing into the computer instructions for (i) speed of movement of the laser beam from the initial point to the second point and (ii) intensity of the laser beam to cut through the thermoplastic material from the initial point to the second point along the selected line segment;

(l) repeating steps (g) through (k) above for each of said interface line segments, wherein in each subsequent repetition of steps (g) though (k) the second point becomes the initial point for the next repetition to complete the set up procedure; executing a cutting procedure comprising:

(m) operating the laser, rotation device and movably adjustable light path to trace the laser beam at predetermined speeds and intensities for each of said interface line segments along each of the beam paths to cut through the cartridge along each such path without impinging on any electrical conductor passing very near to the joining surfaces of adjoining sections to cut the cartridge into cut sections; and, removing the cut sections from the rotation device.

2. A method for disassembling a laser printer toner cartridge having adjoining sections joined at thermoplastic joining surfaces into cut sections comprising:

executing a set-up procedure comprising:

(a) providing a toner cartridge including electrical conductors passing very near to the joining surfaces of the adjoining sections, said joining surfaces comprising a plurality of interface line segments, each of said interface line segments having a thickness;

(b) providing a computer implemented laser cutting system including a computer, a laser adapted to project a laser beam, a rotation device positioned in an initial rotation device position, and a movably adjustable light path;

(c) determining the thickness of the thermoplastic material along each of the line segments;

(d) determining laser beam intensity and laser beam speed of travel along each of the line segments sufficient to cut through the thickness of the thermoplastic material along each of the line segments without impinging on any electrical conductor passing very near to the joining surfaces of adjoining sections;

(e) retaining the cartridge in the rotation device that is in the initial rotation device position;

(f) entering and storing into the computer data representative of the initial rotation device position;

(g) selecting an initial point of a selected line segment of the line segments;

(h) entering and storing into the computer instructions to position the movably adjustable light path to direct the laser beam onto the initial point on the selected line segment and to trace the selected line segment for a predetermined distance to a second point on the selected line segment to thereby define a laser beam path for the selected line segment;

(i) determining whether a change in position of the rotation device from the initial rotation device position is required to enable the predetermined distance of the selected line segment to be traced by the laser beam, and if so required, entering and storing into the computer (i) instructions to move the rotation device to a selected new rotation device position that will enable the predetermined distance of the selected line segment to be traced by the laser beam, (ii) the new rotation device position and (iii) when the rotation device is to be moved to the new rotation device position, and if not so required, proceeding to;

(j) entering and storing into the computer (i) instructions to project the laser beam along the selected line segment for the predetermined distance from the initial point to the second point, (ii) the laser beam path and (iii) the second point;

(k) entering and storing into the computer instructions for (i) speed of movement of the laser beam from the initial point to the second point and (ii) intensity of the laser beam to cut through the thermoplastic material from the initial point to the second point along the selected line segment;

(l) repeating steps (g) through (k) above for each of the line segments until all of the line segments have gone through the set-up procedure, wherein in the each of the repetitions of steps (g) though (k) the second point becomes the initial point for the next repetition to complete the set up procedure;

executing a cutting procedure comprising:

(m) operating the laser, rotation device and optical system to trace the laser beam at predetermined speeds and intensities for each of the line segments along each of the beam paths to cut through the cartridge along each such path without impinging on any electrical conductor passing very near to the joining surfaces of adjoining sections to cut the cartridge into cut sections; and, removing the cut sections from the rotation device.

* * * * *